United States Patent Office 3,351,648
Patented Nov. 7, 1967

3,351,648
PROCESS FOR PREPARING IRON TETRACARBONYL COMPOUNDS WITH MONO-OLEFINIC LIGANDS
Erwin L. Weiss, Grand-Lancy, Geneva, Switzerland, assignor to American Cyanamid Company, Stamford, Conn., a corporation of Maine
No Drawing. Filed Dec. 3, 1963, Ser. No. 327,825
4 Claims. (Cl. 260—439)

This invention relates to novel olefinic iron tetracarbonyl compounds or complexes and a process for their preparation. More particularly, the present invention relates to novel π-olefinic iron tetracarbonyl complexes and a novel process for their preparation.

In accordance with the present invention, π-olefin iron tetracarbonyl complexes of the formula

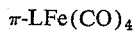

are provided where L is an olefinic ligand characterized by at least one carbonyl group, alpha to an unsaturated carbon to carbon bond.

The olefinic ligands contemplated for use in this invention may be described as substituted ethylenes with carbonyl-containing substituents in the alpha position to an unsaturated carbon to carbon bond. These ligands may be further characterized as α,β-unsaturated carbonyl compounds which are capable of forming the novel iron tetracarbonyl complexes in accordance with the process aspects of this invention. Illustratively, such ligands may be α,β-unsaturated mono- and dicarboxylic acids, anhydrides, esters, amides and aldehydes, and illustratively include acrylic acid, acrylic acid methyl ester, acrylic acid ethyl ester, acrylic acid amide, acrolein, maleic acid, maleic acid methyl ester, maleic acid dimethyl ester, maleic acid anhydride, citraconic acid, citraconic acid anhydride, cinnamic acid, cinnamic acid methyl ester, and cinnamic aldehyde.

In accordance with this invention, these and their equivalent olefinic ligands are reacted with di-iron enneacarbonyl [Fe₂(CO)₉] in accordance with the equation:

to produce the novel iron tetracarbonyl monoolefinic complexes of this invention.

Thus, I have discovered in accordance with this invention that the presence of a carbonyl group in the alpha position to an unsaturated carbon to carbon bond of a substituted ethylene causes such ligands to react with di-iron enneacarbonyl to form iron tetracarbonyl complexes in surprisingly high yields, as for example up to 93%.

It is an important and surprising discovery of the present invention that the unsaturated carbon to carbon bond or group is activated by an adjacent carbonyl group and thus reacts readily with the di-iron enneacarbonyl to form the novel complexes of this invention in good yield. This is particularly surprising in view of the fact that di-iron enneacarbonyl is generally believed to be less active than iron pentacarbonyl or tri-iron dodecacarbonyl.

It is presently known that acrylonitrile may be employed to form acrylonitrile iron tetracarbonyl complexes. Thus, this complex has been produced in very poor yield (on the order of 2 to 3%) by reacting acrylonitrile and various iron carbonyls.

The process of this invention, whereby unusually high yields of the novel iron tetracarbonyl complexes are obtained, is carried out by reacting the di-iron enneacarbonyl with the olefinic ligand at a temperature of from 0° to about 100° C., usually at a temperature of from 0° to 80° C. and preferably at a temperature of from 30° to 60° C. at atmospheric pressure. Uniformly good results have been obtained at temperatures of about 40° to about 45° C.

The reaction is normally carried out in aromatic or aliphatic inert solvents, as for example cyclohexane, benzene, xylene, ketones such as acetone, petroleum ether and the like. Normally, the reaction will be carried out at atmospheric pressures, although subatmospheric or superatmospheric conditions may be employed.

The reaction time is that which is sufficient to form the complex, but typically runs from an hour up to four hours or more.

The compounds of this invention, like many organometallic compounds, may be useful as fuel additives and in metal plating in view of the fact that they contain metal in the zero valent state and may be characterized as being volatile. They are capable of creating free radicals, either by thermal decomposition or reaction with other reagents, and therefore may be employed as polymerization initiators. They may be modified by the reaction of their functional groups, as for example —CHO, —COOH, —COOR, —CONH and the like, and thus are useful as chemical intermediates. Thus, for example, the esterification of these compounds with acrylic, maleic, fumaric or other ligands is contemplated. In addition, they may be polycondensed with polyhydric alcohols such as diols to produce metal-containing polymers having new and desirable properties.

In order to illustrate the present invention, the following examples are given primarily by way of illustration. No specific details or enumerations contained therein should be construed as limitations except insofar as they appear in the appended claims. All parts and percentages are by weight unless otherwise specifically designated.

In carrying out the examples referred to hereinbelow, air and bright daylight were excluded during the purification of the compound. All solvents were carefully made absolute. The melting points were determined in a heating stage microscope and are uncorrected.

All of the substituted ethylenes with substituents containing carbonyl groups in the alpha position to the carbon to carbon unsaturated double bond were purchased commercially and purified where needed, with the exception of maleinimide, maleic acid methyl ester, citraconic acid and fumaric acid dimethyl ester, which were prepared in accordance with literature procedures.

Example 1

Equimolecular quantities of maleic acid anhydride (0.05 mole, 4.90 grams, freshly sublimed) and di-iron enneacarbonyl (18.20 grams) were suspended in 50 ml. of absolute benzene and stirred for 4 hours at 45° C. A yellow precipitate of the complex compound was formed in an amount corresponding to the decomposition of the iron carbonyl; the precipitate was filtered, washed with benzene and dried in a vacuum to yield 11.16 grams of product.

After drawing off the solvent and iron pentacarbonyl, an additional .73 gram was obtained from the yellow filtrate. The crude yield was 89% of the theoretical value and 3.00 grams of the crude product was dissolved in 100 ml. of acetone.

After concentration and storage at 0° C., 2.34 grams of the analytically pure compound (70% of the theoretical yield) was crystallized out of the filtered solution.

Examples 2–18

The complexes identified below and further in Table I hereinafter were prepared in a manner substantially similar to that described in Example 1 above, at a temperature of 40° to 45° C.

In connection with these preparations, the following observations were made.

A—The following products precipitated out directly because of their low solubility:

Example 3

Maleinimide iron tetracarbonyl after a reaction of 2 hours in benzene.

Example 4

Maleic acid iron tetracarbonyl after a reaction time of 1 hour in 50 ml. of acetone.

Example 7

Citraconic acid iron tetracarbonyl after 3 hours in benzene.

Example 8

Fumaric acid iron tetracarbonyl after 2 hours in 50 ml. of acetone.

Example 9

Fumaric acid dimethyl ester iron tetracarbonyl after a 1-hour reaction in benzene.

Example 13

Acrylamide iron tetracarbonyl after 2 hours in benzene.

Example 15

Cinnamic acid iron tetracarbonyl after 1 hour in benzene.

B—The compounds identified below were found to be soluble in benzene and were obtained from the filtered reaction solution after drawing off the solvent and the iron pentacarbonyl in a water-jet vacuum.

Example 2

Citraconic acid anhydride iron tetracarbonyl obtained as a crude product in the form of a brown oil after a 4-hour reaction.

Example 5

Maleic acid methyl ester iron tetracarbonyl obtained as a crystalline mass after a 2-hour reaction period.

Example 6

Maleic acid dimethyl ester iron tetracarbonyl obtained after a reaction of 1.5 hours as an oil.

Example 10

Acrylic acid iron tetracarbonyl obtained after a reaction of 1 hour as a crystalline mass.

Example 11

Acrylic acid methyl ester iron tetracarbonyl obtained after a reaction of 2 hours as a semi-solid.

Example 12

Acrylic acid ethyl ester iron tetracarbonyl obtained after a reaction period of 2 hours as an oil.

Example 14

Acrolein iron tetracarbonyl reacted at 35° C. for a period of 3 hours obtained as an oil.

Example 16

Cinnamic acid methyl ester iron tetracarbonyl obtained after a reaction of 1 hour as an oil.

Example 17

Cinnamic aldehyde iron tetracarbonyl obtained after a reaction of 1 hour as an oil.

Example 18

Methacrylic acid iron tetracarbonyl obtained after a 1-hour reaction as an oil which solidified at 0° C.

C—Further purification was carried out on the complexes identified above and in Table I below by recrystallization from the following solvents:

The compound of Examples 3, 4 and 8 from a methylene chloride-petroleum ether solvent.
The compound of Example 9 from acetone with a few drops of semi-concentrated hydrogen chloride.
The compound of Example 5 from benzene.
The compound of Examples 7 and 15 from acetone.
The compound of Example 16 from petroleum ether.
The compound of Example 17 from a 1:1 benzene-petroleum ether mixture.
The compounds of Examples 6, 10, 11, 13, 14 and 18 were purified by vacuum sublimation.
The compound of Example 12 by vacuum distillation under the conditions specifically set forth in Table I.

The results of the above examples are tabulated in Table I hereinbelow.

TABLE I.—IRON TETRACARBONYL COMPLEXES WITH α, β-UNSATURATED CARBONYL LIGANDS

| Example No. | Ligand | Compound | Yield (Pure Product), Percent | Properties | Melting Point, ° C. |
|---|---|---|---|---|---|
| 1 | Maleic acid anhydride | (structure with O=C–CH, O, C–CH, O) ···Fe(CO)$_4$ | 70 | Pale yellow needles | About 148° (with decomposition) Brown color from about 130°. |
| 2 | Citraconic acid anhydride | (structure with O=C–CH, O, C–CCH$_3$, O) ···Fe(CO)$_4$ | 60 | Yellow crystals | 92–93° (with decomposition). |
| 3 | Maleinimide | (structure HN, C–CH, C–CH, O) ···Fe(CO)$_4$ | 77 | ...do | Decomposition from about 159°. |
| 4 | Maleic acid | HOOCCH‖HOOCCH ···Fe(CO)$_4$ | 93 | Yellow prisms | Decomposition about 150°, Brown color from about 130°. |

TABLE I—Continued

| Example No. | Ligand | Compound | Yield (Pure Product), Percent | Properties | Melting Point, °C. |
|---|---|---|---|---|---|
| 5 | Maleic acid methyl ester | $\begin{array}{c}CH_3OOCCH\\ \parallel \cdots Fe(CO)_4\\ HOOCCH\end{array}$ | 70 | Yellow prisms | About 93° (with decomposition). |
| 6 | Maleic acid dimethyl ester | $\begin{array}{c}CH_3OOCCH\\ \parallel \cdots Fe(CO)_4\\ CH_3OOCCH\end{array}$ | 68 | Yellow needles. Sublimes at 35°/10⁻² Torr. | 36–37°. |
| 7 | Citraconic acid | $\begin{array}{c}HOOCCH\\ \parallel \cdots Fe(CO)_4\\ HOOCCCH_3\end{array}$ | 80 | Yellow crystals | Decomposition from about 90°. |
| 8 | Fumaric acid | $\begin{array}{c}HOOCCH\\ \parallel \cdots Fe(CO)_4\\ HCCOOH\end{array}$ | 79 | Pale yellow crystals | Decomposition from about 155°. |
| 9 | Fumaric acid dimethyl ester | $\begin{array}{c}CH_3OOCCH\\ \parallel \cdots Fe(CO)_4\\ HCCOOCH_3\end{array}$ | 86 | Pale yellow fine needles | About 137° (with decomposition). |
| 10 | Acrylic acid | $\begin{array}{c}CH_2\\ \parallel \cdots Fe(CO)_4\\ HCCOOH\end{array}$ | 68 | Yellow prisms. Sublimes from about 80–90°/10⁻² Torr. | 104–106° (with decomposition). |
| 11 | Acrylic acid methyl ester | $\begin{array}{c}CH_2\\ \parallel \cdots Fe(CO)_4\\ HCCOOCH_3\end{array}$ | 71 | Large pale yellow crystals. Sublimes from 25°/10⁻² Torr. | 28–28.5°. |
| 12 | Acrylic acid ethyl ester | $\begin{array}{c}CH_2\\ \parallel \cdots Fe(CO)_4\\ HCCOOC_2H_5\end{array}$ | 64 | Yellow liquid Sdp. 60–65°/1 Torr. | About −2°. |
| 13 | Acrylic amide | $\begin{array}{c}CH_2\\ \parallel \cdots Fe(CO)_4\\ HCCONH_2\end{array}$ | 68 | Yellow prisms. Sublimes from about 80–95°/10⁻² Torr. | 116–117° (with decomposition). |
| 14 | Acrolein | $\begin{array}{c}CH_2\\ \parallel \cdots Fe(CO)_4\\ HCCHO\end{array}$ | 50 | Yellow crystals. Sublimes 20°/10⁻² Torr. | 34–35.5° Transformation at 31°. |
| 15 | Cinnamic acid | $\begin{array}{c}C_6H_5CH\\ \parallel \cdots Fe(CO)_4\\ HCCOOH\end{array}$ | 80 | Yellow crystals | Decomposition from about 110°. |
| 16 | Cinnamic acid methyl ester | $\begin{array}{c}C_6H_5CH\\ \parallel \cdots Fe(CO)_4\\ HCCOOCH_3\end{array}$ | 64 | do | 63.5°. |
| 17 | Cinnamic aldehyde | $\begin{array}{c}C_6H_5CH\\ \parallel \cdots Fe(CO)_4\\ HCCHO\end{array}$ | 36 | do | 87–92°. |
| 18 | Methacrylic acid | $\begin{array}{c}CH_2\\ \parallel \cdots Fe(CO)_4\\ CH_3CCOOH\end{array}$ | 15 | do | 70–73°. |

All of the compounds are soluble in polar organic solvents such as acetone or alcohols, and only those with slightly polar ligands, as for example the ester and aldehyde groups, are soluble in benzene, carbon tetrachloride or petroleum ether.

The structures of the compounds listed in Table I above were confirmed by infrared spectra employing a Perkin-Elmer instrument with a lattice-prism exchange unit, Model 221 and by elemental analysis.

What I claim is:

1. A process for preparing π-olefin iron tetracarbonyl compounds of the formula $$\pi\text{-LFe(CO)}_4$$

where L is a mono-olefinic ligand characterized by at least one carbonyl group alpha to the unsaturated carbon to carbon bond which comprises reacting the said mono-olefinic ligand with di-iron enneacarbonyl at a temperature of from about 30 to about 60° C. at atmospheric pressure.

2. A process for preparing π-olefin iron tetracarbonyl compounds of the formula $$\pi\text{-LFe(CO)}_4$$

where L is a mono-olefinic ligand characterized by at least one carbonyl group alpha to the unsaturated carbon to carbon bond which comprises reacting in an inert solvent the said mono-olefinic ligand with di-iron enneacarbonyl at a temperature of from about 30 to about 60° C. at atmospheric pressure.

3. A process according to claim 2 in which the mono-olefinic ligand is maleic anhydride.

4. A process according to claim 2 in which the mono-olefinic ligand is maleinimide.

References Cited

UNITED STATES PATENTS 3,126,401  3/1964  Ecke _____ 260—439

OTHER REFERENCES

J. Chatt. et al. in H. Zeiss' "Organo-metallic Chemistry," ACS Monograph Series No. 147, p. 482, Rheinhold Pub. Corp., New York, 1960.

Schenck et al., "Tetrahedron Letters," No. 23, pp. 1059–1064, November 1962.

TOBIAS E. LEVOW, *Primary Examiner.*

E. C. BARTLETT, A. P. DEMERS, *Assistant Examiners.*